United States Patent
Doi

(10) Patent No.: US 10,892,453 B2
(45) Date of Patent: Jan. 12, 2021

(54) BATTERY PACK AND METHOD OF MANUFACTURING BATTERY PACK

(71) Applicant: TOYOTA JIDOSHA KABUSHIKI KAISHA, Toyota (JP)

(72) Inventor: Takayoshi Doi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 171 days.

(21) Appl. No.: 16/276,066

(22) Filed: Feb. 14, 2019

(65) Prior Publication Data

US 2019/0259988 A1 Aug. 22, 2019

(30) Foreign Application Priority Data

Feb. 16, 2018 (JP) ................................. 2018-025954

(51) Int. Cl.
  *H01M 2/10* (2006.01)
  *H01M 10/647* (2014.01)
  *H01M 2/26* (2006.01)
  *H01M 10/6557* (2014.01)
  *H01M 10/04* (2006.01)

(52) U.S. Cl.
  CPC .......... *H01M 2/1077* (2013.01); *H01M 2/263* (2013.01); *H01M 2/266* (2013.01); *H01M 10/0481* (2013.01); *H01M 10/647* (2015.04); *H01M 10/6557* (2015.04); *H01M 2220/20* (2013.01)

(58) Field of Classification Search
  None
  See application file for complete search history.

(56) References Cited

U.S. PATENT DOCUMENTS

| | | | |
|---|---|---|---|
| 8,435,667 B2* | 5/2013 | Kuroda | H01M 2/206 429/159 |
| 2014/0057145 A1* | 2/2014 | Goldstein | H01M 10/6557 429/71 |
| 2014/0308550 A1* | 10/2014 | Shimizu | H01M 2/1241 429/56 |
| 2018/0277818 A1* | 9/2018 | Nagai | H01M 2/206 |
| 2018/0301761 A1* | 10/2018 | Miyake | H01M 2/266 |

FOREIGN PATENT DOCUMENTS

JP  2014-199716 A  10/2014

* cited by examiner

Primary Examiner — Rena Dye Cronin
(74) Attorney, Agent, or Firm — Sughrue Mion, PLLC

(57) ABSTRACT

A battery pack includes a plurality of cell assemblies arranged side by side, and a restraining member restraining the plurality of cell assemblies along a direction in which the cell assemblies are arranged. Each of the plurality of cell assemblies includes a cell, a first spacer, a second spacer, a first connecting member, and a second connecting member. In adjacent cell assemblies, either one of the first and second extension portions of one of the adjacent cell assemblies and either one of the first and second extension portions of the other one of the adjacent cell assemblies are overlapped on each other between the first spacer and the second spacer that are overlapped on each other.

13 Claims, 10 Drawing Sheets

BATTERY PACK AND METHOD OF MANUFACTURING BATTERY PACK

CROSS REFERENCE TO RELATED APPLICATIONS

The present application claims priority from Japanese Patent Application No. 2018-025954 filed on Feb. 16, 2018, which is incorporated by reference herein in its entirety.

BACKGROUND

The present disclosure relates to a battery pack and a method of manufacturing the battery pack.

JP 2014-199716 A discloses an assembled battery (also referred to as a battery pack or a battery stack) in which battery modules are stacked. In the assembled battery disclosed therein, a positive electrode terminal and a negative electrode terminal are arranged on one side surface of a case of each of the battery modules. The positive electrode terminals and the negative electrode terminals of the battery modules are connected by a plurality of bus bars disposed along the side surfaces of the cases. The bus bars include fixing ribs extending toward the battery modules. The bus bars are supported by placing the fixing ribs between the battery modules.

SUMMARY

Vehicle battery packs used in, for example, electric vehicles and hybrid vehicles need to have high capacity and produce high power, and therefore, they exhibit higher performance than batteries used for, for example, home-use storage batteries. Vehicle battery packs are subjected to charging and discharging at high rate, and their performance gradually deteriorates as they are used, but it is possible to reuse them for other applications, such as home-use storage batteries. The present disclosure proposes a novel structure of the battery pack that allows easy reuse.

A battery pack proposed herein includes a plurality of cell assemblies arranged side by side, and a restraining member restraining the plurality of cell assemblies along a direction in which the cell assemblies are arranged.

Each of the plurality of cell assemblies includes a cell, a first spacer, a second spacer, a first connecting member, and a second connecting member.

Each of the cells includes an outer casing, a positive electrode terminal attached to the outer casing, and a negative electrode terminal attached to the outer casing.

The outer casing includes a first surface facing an adjacent one of the cell assemblies and a second surface facing opposite the first surface with respect to the direction in which the plurality of cell assemblies are arranged.

The first spacer is overlapped on the first surface, and the first spacer includes a first-spacer inner side surface overlapped on the first surface and a first-spacer outer side surface opposite the first-spacer inner side surface.

The second spacer is overlapped on the second surface, and the second spacer includes a second-spacer inner side surface overlapped on the second surface and a second-spacer outer side surface opposite the second-spacer inner side surface.

The first connecting member is attached to the positive electrode terminal. The first connecting member includes a first extension portion being electrically insulated from the outer casing and extending along at least one of the outer side surface of the first spacer and the outer side surface of the second spacer.

The second connecting member is attached to the negative electrode terminal. The second connecting member includes a second extension portion being electrically insulated from the outer casing and extending along at least one of the outer side surface of the first spacer and the outer side surface of the second spacer.

The first spacer of one of adjacent cell assemblies and the second spacer of another one of the adjacent cell assemblies are overlapped on each other. Either one of the first and second extension portions of the one of the adjacent cell assemblies and either one of the first and second extension portions of the other one of the adjacent cell assemblies are overlapped on each other between the first spacer and the second spacer that are overlapped on each other.

The above-described battery pack provides sufficient electrical conduction between a plurality of cell assemblies by restraining the plurality of cell assemblies with the restraining member. When the restraining by the restraining member is removed, the plurality of cell assemblies are detached from each other. Thus, the cells are allowed to be removed easily.

Here, the first connecting member and the second connecting member may be respectively welded at least in part to the positive electrode terminal and the negative electrode terminal.

It is also possible that the first extension portion of each of the plurality of cell assemblies may extend along the outer side surface of the first spacer. The second extension portion of each of the plurality of cell assemblies may extend along the outer side surface of the second spacer. In this case, it is preferable that the first extension portion of the one of the adjacent cell assemblies and the second extension portion of the other one of the adjacent cell assemblies be overlapped on each other.

In this case, the outer side surface of the first spacer may include a recess into which the first extension portion is fitted. The outer side surface of the second spacer may include a recess into which the second extension portion is fitted. The first extension portion may extend to a laterally middle portion of the first spacer. The second extension portion may extend to a laterally middle portion of the second spacer.

In another embodiment, the first extension portion of each of the plurality of cell assemblies may extend along both the outer side surface of the first spacer and the outer side surface of the second spacer. The second extension portion of each of the plurality of cell assemblies may extend along both the outer side surface of the first spacer and the outer side surface of the second spacer. In this case, the first extension portions of the adjacent cell assemblies may be overlapped on each other, and the second extension portions of the adjacent cell assemblies may be overlapped on each other.

Further in this case, the outer side surface of the first spacer may include a first recess into which the first extension portion is fitted, and a second recess into which the second extension portion is fitted. In this case, the outer side surface of the second spacer may include a first recess into which the first extension portion is fitted, and a second recess into which the second extension portion is fitted. In addition, the first extension portion may extend to a laterally middle portion of each of the first spacer and the second spacer. Also, the second extension portion may extend to a laterally middle portion of each of the first spacer and the second spacer, with the second extension portion electrically insulated from the first extension portion.

It is also possible to provide terminal plates disposed respectively at opposite ends of the arranged plurality of cell assemblies. The restraining member may also include a pair of pressing members clamping the terminal plates together with the plurality of cell assemblies.

A method of manufacturing a battery pack according to the present disclosure may include the steps of preparing cells, preparing cell assemblies, and restraining the cell assemblies.

Each of the cells prepared in the step of preparing cells may include an outer casing including at least a pair of opposite first and second surfaces, a positive electrode terminal attached to the outer casing, and a negative electrode terminal attached to the outer casing.

In the step of preparing cell assemblies, cell assemblies are prepared. Each of the prepared cell assemblies includes: a cell; a first spacer overlapped on the first surface of the outer casing; a second spacer overlapped on the second surface of the outer casing; a first connecting member attached to the positive electrode terminal, the first connecting member including a first extension portion being insulated from the outer casing and extending along at least one of the outer side surface of the first spacer and the outer side surface of the second spacer; and a second connecting member attached to the negative electrode terminal, the second connecting member including a second extension portion being insulated from the outer casing and extending along at least one of the outer side surface of the first spacer and the outer side surface of the second spacer that are overlapped on the outer casing. The first spacer, the second spacer, the first connecting member, and the second connecting member are assembled onto the cell.

The step of restraining cell assemblies includes: arranging a plurality of cell assemblies side by side; disposing terminal plates at opposite ends of the arranged plurality of cell assemblies; and restraining the plurality of cell assemblies and the terminal plates disposed at the opposite ends of the plurality of cell assemblies by a restraining member. The first spacer of one of adjacent cell assemblies and the second spacer of another one of the adjacent cell assemblies are overlapped on each other. Either one of the first and second extension portions of the one of the adjacent cell assemblies and either one of the first and second extension portions of the other one of the adjacent cell assemblies are overlapped on each other between the first spacer and the second spacer that are overlapped on each other.

It is also possible that, for example, in each of the cell assemblies prepared in the step of preparing cell assemblies, the first extension portion may extend along the outer side surface of the first spacer, and the second extension portion may extends along the outer side surface of the second spacer. In this case, in the step of restraining the cell assemblies, it is preferable that the first extension portion of the one of the adjacent cell assemblies and the second extension portion of the other one of the adjacent cell assemblies be overlapped on each other.

In another embodiment, it is possible that, in each of the cell assemblies prepared in the step of preparing cell assemblies, the first extension portion may extend along both the outer side surface of the first spacer and the outer side surface of the second spacer, and the second extension portion may extend along both the outer side surface of the first spacer and the outer side surface of the second spacer. In this case, the step of restraining the cell assemblies may further include overlapping the first extension portions of the adjacent cell assemblies on each other, and overlapping the second extension portions of the adjacent cell assemblies on each other.

DETAILED DESCRIPTION

Figure 1:
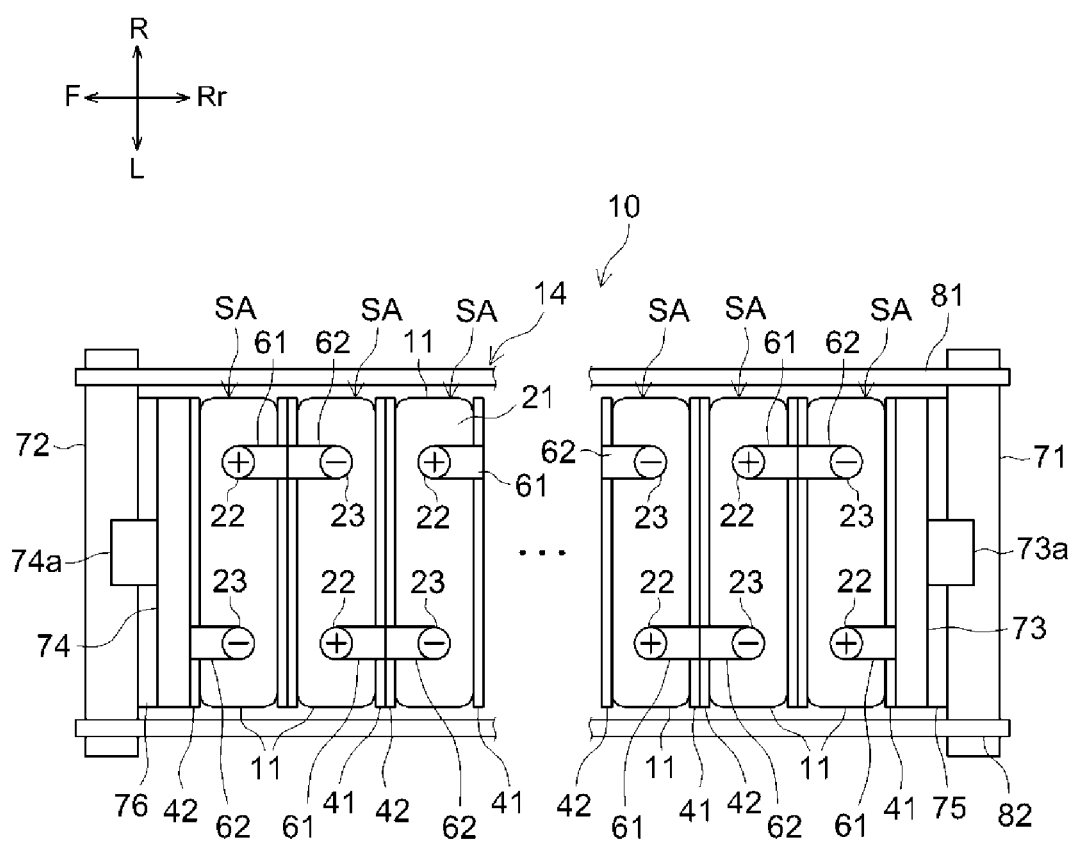
FIG. 1 is a plan view illustrating a battery pack 10 proposed herein.

Hereinbelow, embodiments of a battery pack, a method of manufacturing the battery pack, and a cell assembly for the battery pack according to the present disclosure will be described in detail. It should be noted, however, that the embodiments described herein are, of course, not intended to limit the present invention. The present invention is not limited to the embodiments described herein unless specifically stated otherwise. The drawings are depicted schematically and do not necessarily reflect actual objects. The features and components that exhibit the same effects are denoted by the same reference symbols as appropriate, and the description thereof will not be repeated. For brevity and clarity, reference symbols may be omitted in some detailed drawings, where appropriate. The directions designated in the drawings, up, down, left, right, front, and rear, are represented by arrows denoted as U, D, L R, F, and Rr, respectively. It should be noted that the directional terms as used herein, such as up, down, left, right, front, and rear, do not determine the direction, orientation, or arrangement of actual battery pack or cells.

Figure 2:
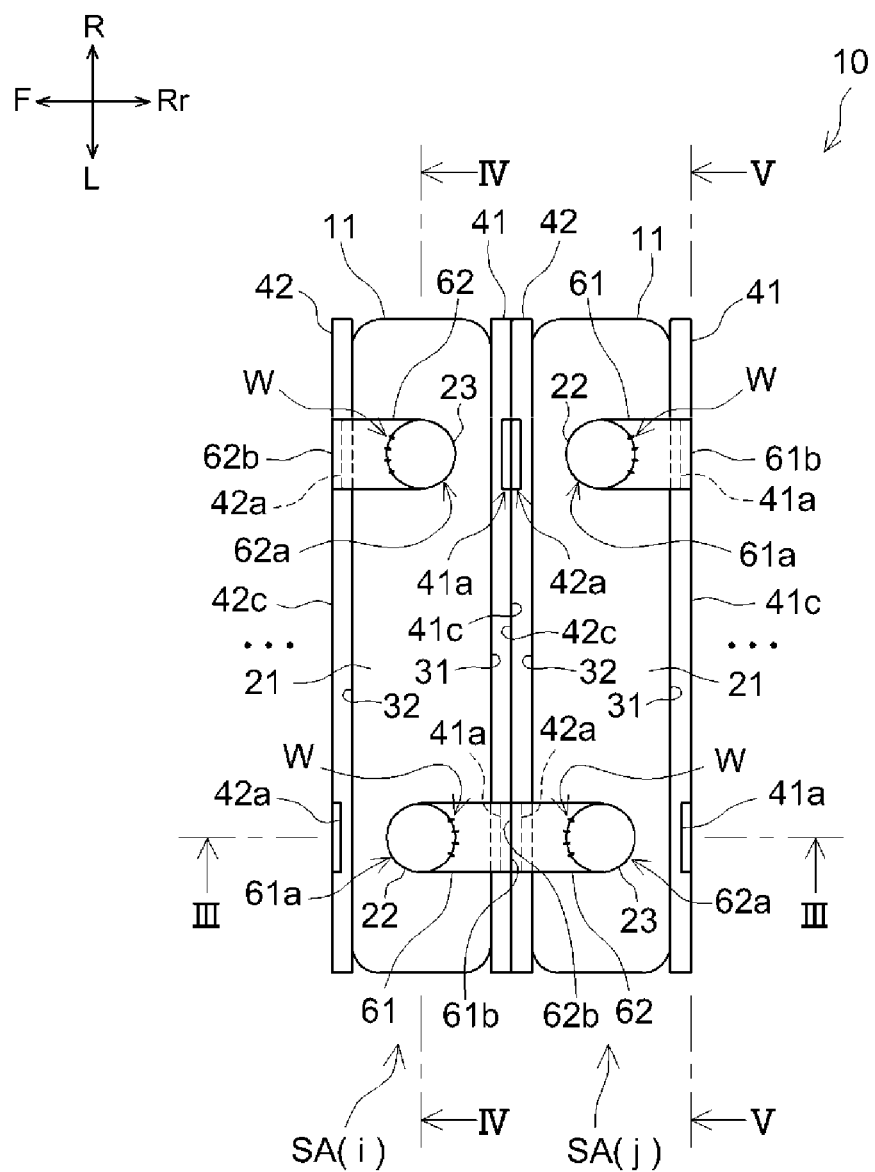
FIG. 2 is a plan view illustrating cell assemblies SA(i) and SA(j) that are adjacent to each other in the battery pack 10.
Figure 3:
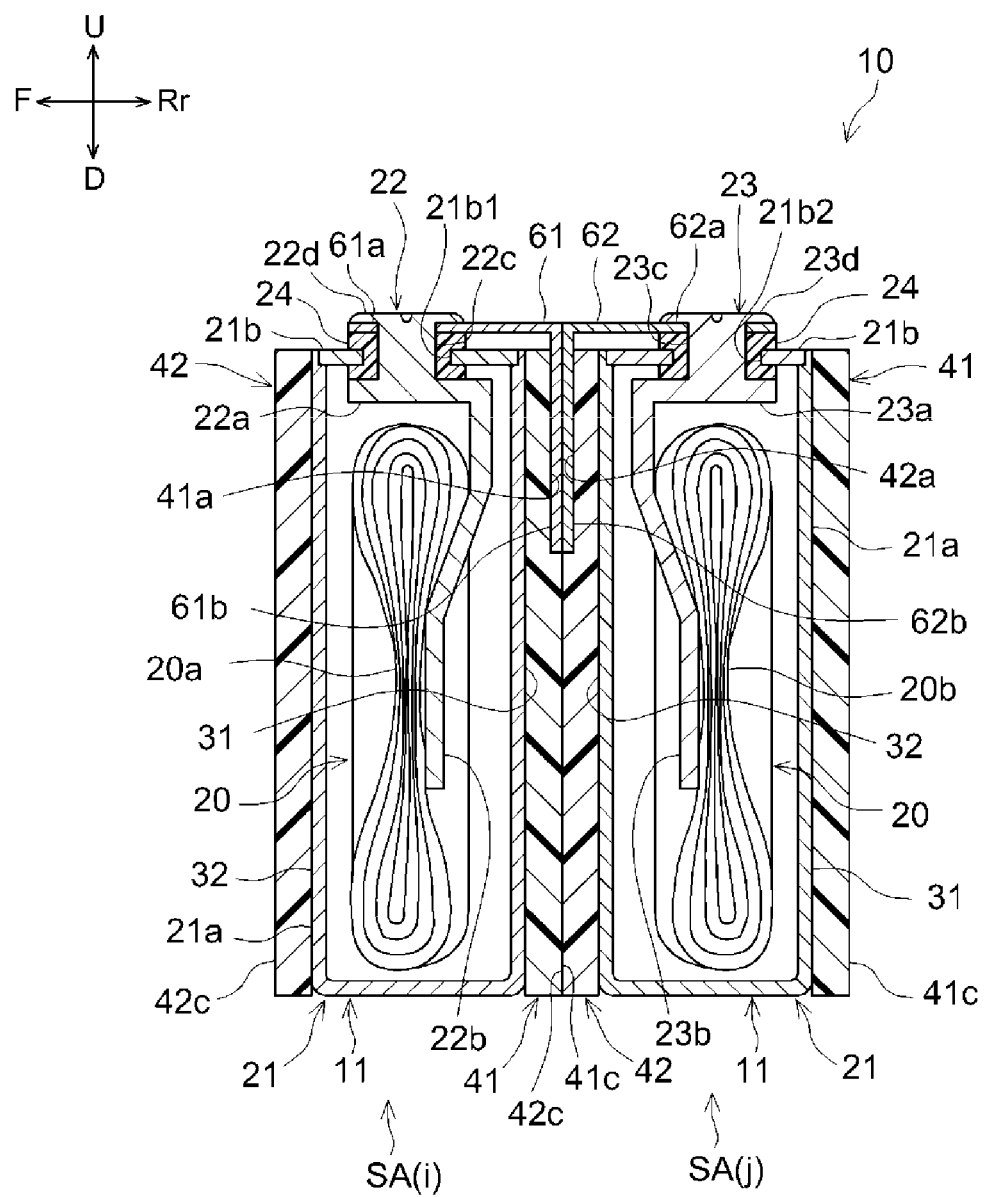
FIG. 3 is a cross-sectional view taken along line III-III in FIG. 2.
Figure 4:
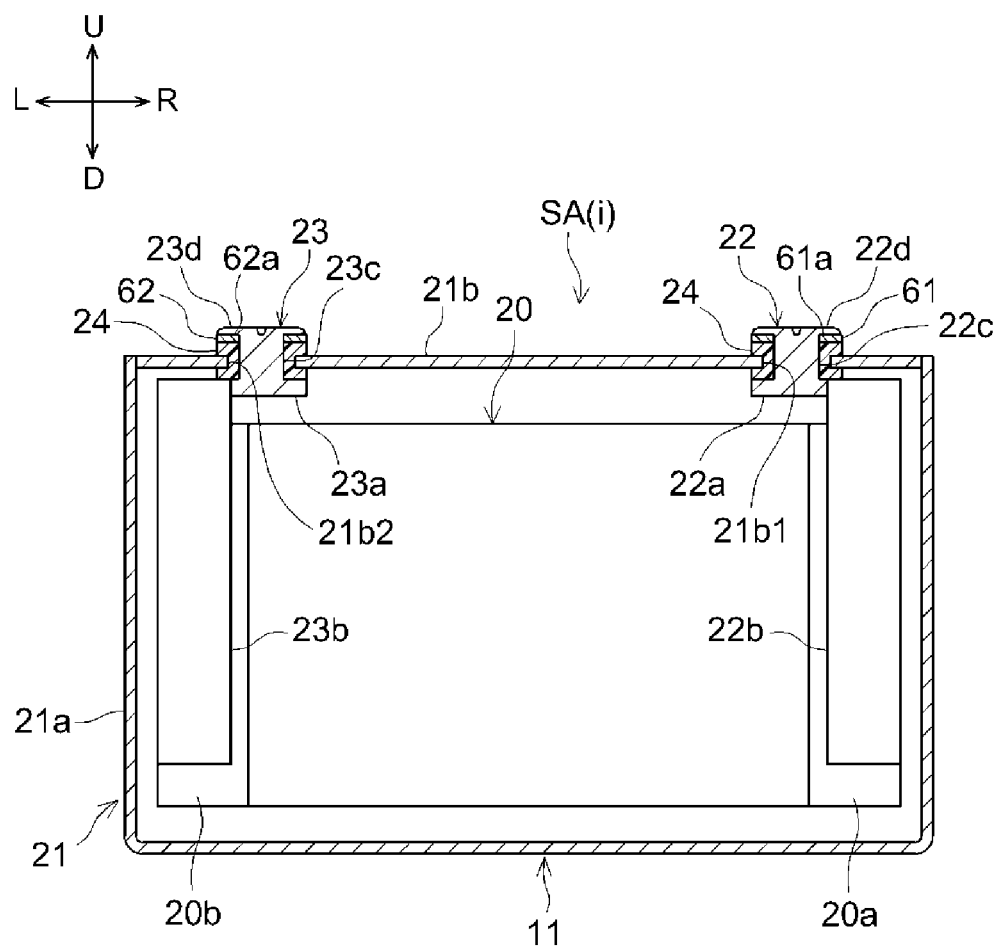
FIG. 4 is a partial cross-sectional view taken along line IV-IV in FIG. 2.
Figure 5:
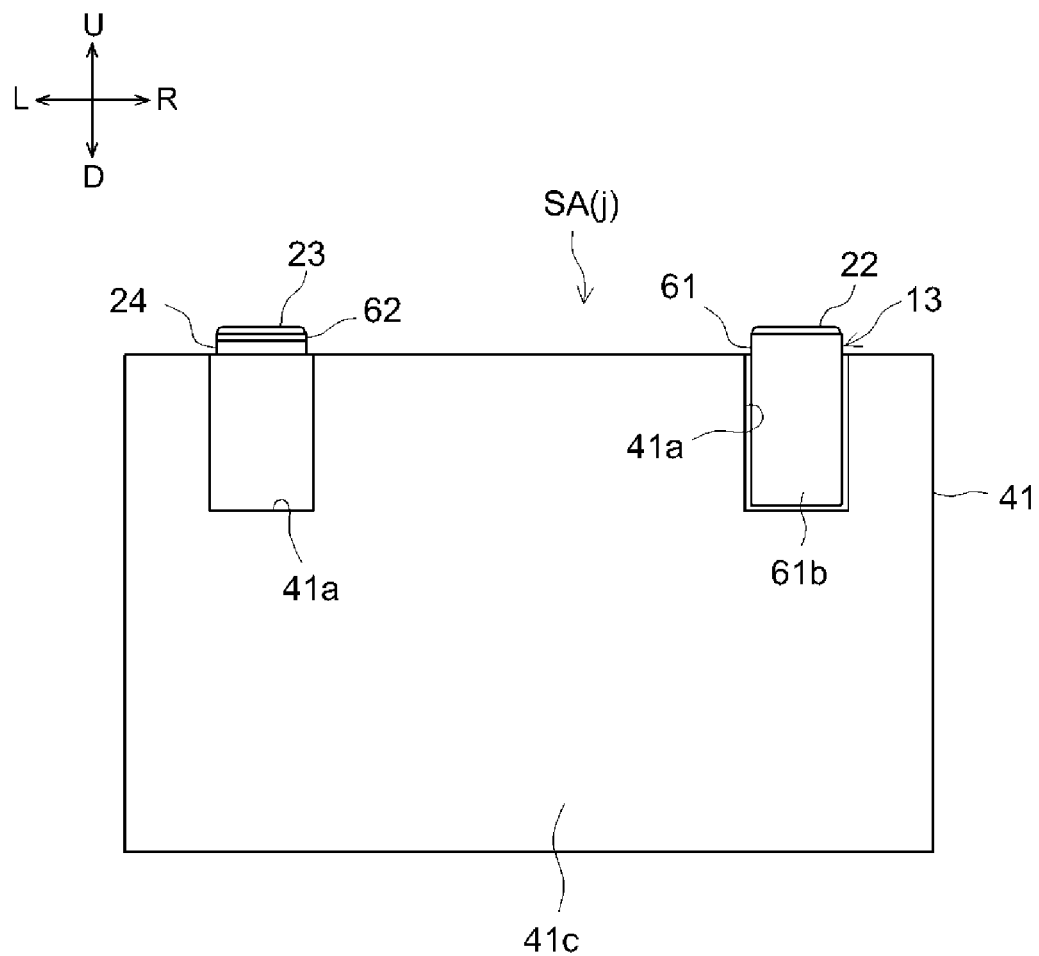
FIG. 5 is a side view taken along line V-V in FIG. 2, which shows a side view of the cell assembly SA(j).

FIG. 1 is a plan view illustrating a battery pack 10 according to the present disclosure. FIG. 2 is a plan view illustrating adjacent cell assemblies SA(i) and SA(j) of the battery pack 10. FIG. 3 is a cross-sectional view taken along line III-III in FIG. 2. FIG. 3 is a cross-sectional view illustrating adjacent cell assemblies SA(i) and SA(j) of the battery pack 10. FIG. 4 is a partial cross-sectional view taken along line Iv-Iv in FIG. 2, which shows a schematic view of a cell 11 incorporated in the battery pack 10. FIG. 5 is a side view taken along line v-v in FIG. 2, which shows a side view of the cell assembly SA(j). Reference characters (i) and (j) are used to distinguish between a pair of cell assemblies SA that are adjacent to each other among a plurality of cell assemblies SA that are incorporated in the battery pack 10. Herein, the term "cell assembly" refers to an assembly in which a single cell 11 is assembled with a first spacer 41, a second spacer 42, a first connecting member 61, and a second connecting member 62.

Battery Pack 10

As illustrated in FIG. 1, the battery pack 10 includes a plurality of cell assemblies SA and a restraining member 14. Each of the cell assemblies SA includes a cell 11, a first spacer 41, a second spacer 42, a first connecting member 61, and a second connecting member 62.

Cell 11

A plurality of cells 11 are arranged side by side. The number of cells 11 incorporated in the battery pack 10 is not limited to a particular number, unless specifically stated otherwise. Among the plurality of cells 11, those arranged in a middle portion are not shown in FIG. 1. Each of the cells 11 includes an outer casing 21, a positive electrode terminal 22, and a negative electrode terminal 23.

Outer Casing 21

The outer casing 21 is a casing that encloses a battery element 20 (also referred to as an electrode assembly) of the cell 11. The outer casing 21 includes a pair of opposing surfaces, a first surface 31 and a second surface 32. Here, the first surface 31 faces an adjacent cell assembly SA. The second surface 32 faces opposite the first surface 31 with respect to the direction in which the plurality of cell assemblies SA are arranged.

Battery Element 20

Herein, the battery element 20 may be an electrode assembly in which a positive electrode sheet and a negative electrode sheet are stacked with a separator interposed therebetween. The electrode assembly may be either what is called a wound electrode assembly or what is called a stacked electrode assembly. The wound electrode assembly is an electrode assembly in which a strip-shaped positive electrode sheet and a strip-shaped negative electrode sheet are stacked and wound with a strip-shaped separator interposed therebetween. The stacked electrode assembly may be an electrode assembly in which a plurality of positive electrode sheets and a plurality of negative electrode sheets are alternately stacked with separators interposed therebetween. The structure of the electrode assembly and the internal structure of the cell 11 are well known, and they are not limited to specific structures in the present invention. The structure of the electrode assembly and the internal structure of the cell 11 will not be detailed herein.

The specific structure of the outer casing 21 is not particularly limited. Examples of the outer casing 21 may include an aluminum case formed into a rectangular parallelepiped shape and a structure comprising a laminate film covering the battery element. In this embodiment, as illustrated in FIG. 4, the outer casing 21 includes a case main body 21a in a substantially rectangular parallelepiped shape one side surface of which is open, and a lid 21b fitted to the opening of the case main body 21a. The battery element 20 is enclosed in the case main body 21a. The battery element 20 includes a positive electrode sheet-current collecting portion 20a and a negative electrode sheet-current collecting portion 20b. The positive electrode sheet-current collecting portion 20a is connected to the positive electrode terminal 22 attached to the outer casing 21. The negative electrode sheet-current collecting portion 20b is connected to the negative electrode terminal 23 attached to the outer casing 21. In this embodiment, each of the positive electrode current collector terminal 22 and the negative electrode current collector terminal 23 is attached to the lid 21b of the outer casing 21.

Lid 21b

As illustrated in FIGS. 3 and 4, the lid 21b includes mounting holes 21b1 and 21b2 for fitting the positive electrode terminal 22 and the negative electrode terminal 23 therein. In this embodiment, the positive electrode current collector terminal 22 and the negative electrode current collector terminal 23 are respectively attached to the mounting holes 21b1 and 21b2, each of which is fitted with an insulating member 24. The insulating member 24 should preferably be made of an elastomer or a resin material that provides sufficient hermeticity for the mounting holes 21b1 and 21b2 to which the positive electrode terminal 22 and the negative electrode terminal 23 are fitted. The insulating member 24 may be composed of either a single part or a plurality of parts. The insulating member 24 may be composed of, for example, two parts, a member that is fitted to the inside the lid 21b and a member that is fitted to the outside of the lid 21b.

Positive Electrode Terminal 22

As illustrated in FIGS. 3 and 4, the positive electrode terminal 22 includes a base portion 22a, an attachment portion 22b, and a shaft portion 22c. The positive electrode terminal 22 is attached to the mounting hole 21b1 of the outer casing 21 with the insulating member 24 interposed between the positive electrode terminal 22 and the mounting hole 21b1. The base portion 22a is disposed inside the outer casing 21. The base portion 22a is provided with the attachment portion 22b and the shaft portion 22c. The attachment portion 22b extends from the base portion 22a to the inside of the outer casing 21 and is conductively connected to the positive electrode sheet-current collecting portion 20a. The shaft portion 22c is inserted through the mounting hole 21b1 with the insulating member 24 interposed between the shaft portion 22c and the mounting hole 21b1. A first connecting member 61 serving as a connecting member is fitted to a portion of the shaft portion 22c that protrudes outside the outer casing 21. A mounting hole for fitting the shaft portion 22c therein is formed in a first connecting portion 61a of the first connecting member 61. A tip end 22d of the shaft portion 22c is fastened to the first connecting portion 61a of the first connecting member 61. At least a portion of the tip end 22d of the shaft portion 22c is welded to the first connecting portion 61a.

Negative Electrode Terminal 23

The negative electrode terminal 23 includes a base portion 23a, an attachment portion 23b, and a shaft portion 23c. The negative electrode terminal 23 is attached to the mounting hole 21b2 of the outer casing 21 with the insulating member 24 interposed between the negative electrode terminal 23 and the mounting hole 21b2. The base portion 23a is disposed inside the outer casing 21. The base portion 23a is provided with the attachment portion 23b and the shaft portion 23c. The attachment portion 23b extends from the base portion 23a to the inside of the outer casing 21 and is conductively connected to the negative electrode sheet-current collecting portion 20b. The shaft portion 23c is inserted through the mounting hole 21b2 with the insulating member 24 interposed between the shaft portion 23c and the mounting hole 21b2. A second connecting member 62 serving as a connecting member is fitted to a portion of the shaft portion 23c that protrudes outside the outer casing 21, with the insulating member 24 interposed between the second connecting member 62 and the shaft portion 23c. A mounting hole for fitting the shaft portion 23c therein is formed in a second connecting portion 62a of the second connecting member 62. A tip end 23d of the shaft portion 23c is fastened to the second connecting portion 62a of the second connecting member 62. At least a portion of the tip end 23d of the shaft portion 23c is welded to the second connecting portion 62a.

In this embodiment, welded portions W are provided at the edge of the tip end 22d of the shaft portion 22c that is fastened to the first connecting member 61 and the edge of the tip end 23d of the shaft portion 23c that is fastened to the second connecting member 62. Thus, the first connecting member 61 and the second connecting member 62 are respectively welded at least in part to the positive electrode terminal 22 and the negative electrode terminal 23. The welded portions W ensures reliable electrical conduction between the first connecting member 61 and positive electrode terminal 22 and between the second connecting member 62 and the negative electrode terminal 23.

Here, the positive electrode sheet-current collecting portion 20a and the positive electrode terminal 22, and the negative electrode sheet-current collecting portion 20b and the negative electrode terminal 23 are subjected to welding. In addition, the positive electrode sheet-current collecting portion 20a and the positive electrode terminal 22, and the negative electrode sheet-current collecting portion 20b and the negative electrode terminal 23 are subjected to a potential that can be generated during charging and discharging. For this reason, in selecting the materials used respectively for the positive electrode sheet-current collecting portion 20a and the positive electrode sheet-current collecting portion 20a and for the negative electrode sheet-current collecting portion 20b and the negative electrode terminal 23, corrosion resistance to the potential generated in the battery and welding quality should be taken into consideration. It is desirable that the positive electrode sheet-current collecting portion 20a and the positive electrode sheet-current collecting portion 20a have required corrosion resistance and be made of the same material, and that the negative electrode sheet-current collecting portion 20b and the negative electrode terminal 23 also have required corrosion resistance and be made of the same material. From this viewpoint, it is preferable that the current collecting portion 20a of the positive electrode sheet and the positive electrode terminal 22 be made of, for example, an aluminum material. On the other hand, it is preferable that the current collecting portion 20b of the negative electrode sheet and the negative electrode terminal 23 be made of, for example, copper.

As illustrated in FIGS. 2 and 3, among the plurality of cells 11 that are arranged side by side in the battery pack 10, adjacent cells 11 are arranged so that the first surface 31 of the outer casing 21 of one of the adjacent cells 11 and the second surface 32 of the outer casing 21 of the other one of the adjacent cells 11 face each other.

First Spacer 41 and Second Spacer 42

The first spacer 41 is overlapped on the first surface 31 of the outer casing 21. The second spacer 42 is overlapped on the second surface 32 of the outer casing 21. Each of the first spacer 41 and the second spacer 42 is an electrically insulative plate. It is also possible that a passage of a cooling medium (for example, air) for cooling the cell 11 may be formed therein. Here, an outer side surface 41c of the first spacer 41 is opposite to the side surface that is overlapped on the first surface 31. An outer side surface 42c of the second spacer 42 is opposite to the side surface that is overlapped on the second surface 32. When the cell assemblies SA are arranged, the first spacer 41 and the second spacer 42 are interposed between the cells 11 of adjacent cell assemblies SA. That is, adjacent cell assemblies SA are arranged so that the outer side surface 41c of the first spacer 41 and the outer side surface 42c of the second spacer 42 are overlapped on each other.

First Connecting Member 61

The first connecting member 61 is attached to the positive electrode terminal 22. The first connecting member 61 includes a first extension portion 61b extending along at least one of the outer side surface 41c of the first spacer 41 and the outer side surface 42c of the second spacer 42, with the first extension portion 61b being electrically insulated from the outer casing 21. In the embodiment shown in FIGS. 1 to 3, the first connecting member 61 includes a first connecting portion 61a connected to the positive electrode terminal 22, and a first extension portion 61b extending along the outer side surface of the first spacer 41 that is overlapped on the first surface 31. The first connecting member 61 is electrically insulated from the outer casing 21 by the insulating member 24.

Second Connecting Member 62

The second connecting member 62 is attached to the negative electrode terminal 23. The second connecting member 62 includes a second extension portion 62b extending along at least one of the outer side surface 41c of the first spacer 41 and the outer side surface 42c of the second spacer 42, with the second extension portion 62b being electrically insulated from the outer casing 21. In the embodiment shown in FIGS. 1 to 3, the second connecting member 62 includes a second connecting portion 62a connected to the negative electrode terminal 23, and a second extension portion 62b extending along the outer side surface of the second spacer 42 that is overlapped on the second surface 32. The second connecting member 62 is electrically insulated from the outer casing 21 by the insulating member 24.

In this embodiment, each of the first connecting member 61 and the second connecting member 62 is an angularly bent member formed by bending an electrically conductive plate. One end of the first connecting member 61 is provided with a mounting hole serving as the first connecting portion 61a that is fitted to the shaft portion 22c of the positive electrode terminal 22. The first connecting member 61 extends along the upper edge of the outer casing 21 from the first connecting portion 61a fitted to the shaft portion 22c of the positive electrode terminal 22, and is angularly bent along the outside of the first spacer 41, which is overlapped on the first surface 31 of the outer casing 21. The first extension portion 61b is provided for the angularly bent portion.

One end of the second connecting member 62 is provided with a mounting hole serving as the second connecting portion 62a that is fitted to the shaft portion 23c of the negative electrode terminal 23. The second connecting member 62 extends along the upper edge of the outer casing 21 from the second connecting portion 62a fitted to the shaft portion 23c of the negative electrode terminal 23, and is angularly bent along the outside of the second spacer 42, which is overlapped on the second surface 32 of the outer casing 21. The second extension portion 62b is provided for the angularly bent portion.

In this embodiment, the first spacer 41 includes a recess 41a into which the first extension portion 61b is fitted. Likewise, the second spacer 42 includes a recess 42a into which the second extension portion 62b is fitted. The recess 41a and the recess 42a are formed respectively in the side surfaces on which the first spacer 41 and the second spacer 42 are overlapped. In addition, the first extension portion 61b and the second extension portion 62b need to be in contact with each other between the first spacer 41 and the second spacer 42. For this reason, it is desirable that the recess 41a be formed shallower than the thickness of the first extension portion 61b. Likewise, it is desirable that the recess 42a be formed shallower than the thickness of the second extension portion 62b. Because the recess 41a and the recess 42a are formed in this way, the battery pack 10 does not take up a large space with respect to the direction in which the cell assemblies SA are arranged, resulting in space savings.

The recess 41a of the first spacer 41 may be formed deeply so that both the first extension portion 61b and the second extension portion 62b that are overlapped can be fitted therein. In this case, the second spacer 42 may not be provided with the recess 42a into which the second extension portion 62b is fitted. The recess 42a of the second spacer 42 may be formed deeply so that both the first extension portion 61b and the second extension portion 62b can be fitted therein. In this case, the first spacer 41 may not be provided with the recess 41a into which the first extension portion 61b is fitted.

Note that, in this embodiment, the position at which the first extension portion 61b is fitted to the first spacer 41 may be either laterally on the right or laterally on the left. For example, in the cell assembly SA(i) shown in FIG. 2, the first extension portion 61b is fitted to a left side portion of the first spacer 41. On the other hand, in the cell assembly SA(j), the first extension portion 61b is fitted to a right side portion of the first spacer 41. In order to reduce the number of necessary parts for the first spacer 41, it is possible that the recess 41a to which the first extension portion 61b is fitted may be formed at each of the laterally left and right sides of the first spacer 41, as illustrated in FIG. 5.

The tip end 22d of the shaft portion 22c of the positive electrode terminal 22 is fastened to the first connecting portion 61a provided for the first connecting member 61. The tip end 23d of the shaft portion 23c of the negative electrode terminal 23 is fastened to the second connecting portion 62a provided for the second connecting member 62.

When fastening the tip end 22d of the shaft portion 22c of the positive electrode terminal 22, the positive electrode terminal 22 is held by a press head from the inside of the lid 21b. Then, a fastening member is pressed against the tip end 22d of the shaft portion 22c of the positive electrode terminal 22 along the axial direction to squash the tip end 22d. Likewise, when fastening the tip end 23d of the shaft portion 23c of the negative electrode terminal 23, the negative electrode terminal 23 is held by a press head from the inside of the lid 21b. This means that the first connecting member 61 and the second connecting member 62 need to be attached to the positive electrode terminal 22 and the negative electrode terminal 23 before the lid 21b is welded to the case main body 21a.

In addition, in order to provide sufficient hermeticity between the case main body 21a and the lid 21b, the lid 21b may be welded to the opening of the case main body 21a by all-around welding. The all-around welding may be carried out by, for example, laser welding. In this case, for example, a lid subassembly is prepared, in which the positive electrode terminal 22, the negative electrode terminal 23, and the battery element 20 are attached to the lid 21b. The battery element 20 is enclosed in the case main body 21a, and the lid 21b is placed on the opening of the case main body 21a. Then, a laser beam is applied to the edge of the lid 21b to thereby weld all around the edge of the lid 21b. If the first connecting member 61 is welded to the positive electrode terminal 22 and the second connecting member 62 is welded to the negative electrode terminal 23 before the lid 21b is welded all around, the first connecting member 61 and the second connecting member 62 are located over the edge of the lid 21b that is to be welded. In the embodiment shown in FIGS. 2 and 3, the first connecting member 61 and second connecting member 62 may hinder all-around welding of the lid 21b.

For that reason, the first connecting member 61 should be in a plate shape such as not to hinder the all-around welding of the lid 21b at the stage where it is attached to the positive electrode terminal 22. Thereafter, at the stage where the first spacer 41 is attached to the first surface 31 of the outer casing 21, it is desirable that the first connecting member 61 be angularly bent so that the portion that later forms the first extension portion 61b extends along the outer side surface of the first spacer 41. Alternatively, the first connecting portion 61a of the first connecting member 61 should be in a plate shape such as not to hinder all-around welding of the lid 21b. The first extension portion 61b of the first connecting member 61 may be formed of a metal foil. For example, a metal foil as the first extension portion 61b may be joined to the first connecting portion 61a of the first connecting member 61 attached to the positive electrode terminal 22, and the portion that later forms the first extension portion 61b may be attached along the outer side surface of the first spacer 41. The second connecting member 62 may be constructed in the same manner.

In addition, as described previously, it is preferable that the positive electrode sheet-current collecting portion 20a and the positive electrode terminal 22 be made of, for example, an aluminum material. On the other hand, it is preferable that the current collecting portion 20b of the negative electrode sheet and the negative electrode terminal 23 be made of, for example, copper. Herein, it is possible to use zinc-plated copper for the first connecting member 61 attached to the positive electrode terminal 22. It is also possible that the portion of the first connecting portion 61a of the first connecting member 61 that is fitted to the positive electrode terminal 22 may be formed of zinc-plated copper and the rest of the portion of the first connecting portion 61a and the second connecting member 62 may be formed of aluminum. This serves to prevent galvanic corrosion that results from different materials being in contact with each other.

Assembling of Cell Assembly SA and Battery Pack 10

As illustrated in FIGS. 2 and 3, the cell 11 of each cell assembly SA includes a positive electrode terminal 22, a negative electrode terminal 23, and an outer casing 21 including at least a pair of opposite surfaces, the first surface 31 and the second surface 32. The positive electrode current collector terminal 22 and the negative electrode current collector terminal 23 are attached to the outer casing 21. The first spacer 41 is overlapped on the first surface 31 of the outer casing 21. The second spacer 42 is overlapped on the second surface 32 of the outer casing 21. In the embodiment shown in FIGS. 1 to 3, prepared cell assemblies SA are electrically connected in series. In this embodiment, the first extension portion 61b of the first connecting member 61 extends along the outer side surface 41c of the first spacer 41. The second extension portion 62b of the second connecting member 62 extends along the outer side surface 42c of the second spacer 42. As illustrated in FIG. 1, a plurality of cell assemblies SA are arranged so that the first spacers 41 and the second spacers 42 face each other. As illustrated in FIGS. 2 and 3, the first extension portion 61b of one of two adjacent cell assemblies SA and the second extension portion 62b of another one of the cell assemblies SA are overlapped and in contact with each other.

Terminal plates 73 and 74 are disposed at opposite ends of the plurality of cell assemblies SA arranged in this way. The terminal plate 73 is overlapped and in contact with the first connecting member 61 attached to the positive electrode terminal 22 of the cell assembly SA disposed at one end. The terminal plate 74 is overlapped and in contact with the second connecting member 62 attached to the negative electrode terminal 23 of the cell assembly SA disposed at the other end. The plurality of cell assemblies SA and the terminal plates 73 and 74, which are disposed at the opposite ends of the plurality of cell assemblies SA, are restrained by the restraining member 14 (see FIG. 1).

Restraining Member 14

As illustrated in FIG. 1, the restraining member 14 includes a pair of pressing members 71 and 72. Each of the pressing members 71 and 72 is also referred to as an end plate. The pressing members 71 and 72 are disposed so as to clamp the plurality of arranged cell assemblies SA together with the terminal plates disposed at the opposite ends of the plurality of arranged cell assemblies SA. In this embodiment, restraining bands 81 and 82 are attached to the pressing members 71 and 72. The restraining bands 81 and 82 are attached to the pressing members 71 and 72 so as to span across the pressing members 71 and 72. The restraining bands 81 and 82 are members for maintaining a distance between the pressing members 71 and 72.

In the embodiment shown in FIG. 1, insulating spacers 75 and 76 are disposed between the pressing member 71 and the terminal plate 73 and between the pressing member 72 and the terminal plate 74, respectively. The pair of pressing members 71 and 72 press the plurality of cell assemblies SA along the direction in which they are arranged. As a result, the first extension portion 61b and the second extension portion 62b make contact with each other firmly, providing reliable electrical conduction therebetween. On the other hand, when the pair of pressing members 71 and 72 are removed, the plurality of cell assemblies SA are detached from each other. Thus, the cell assemblies SA are allowed to be removed easily. For example, when a used battery pack 10 needs to be reused, it is easy, for example, to replace a cell assembly SA with another one because the plurality of cell assemblies SA can be detached from each other by simply removing the pair of pressing members 71 and 72. Moreover, it is possible to eliminate a member that greatly protrudes upwardly from the cells 11, such as a conventional bus bar, resulting in space savings of the battery pack 10.

In this embodiment, the battery pack 10 includes the terminal plates 73 and 74 that are disposed at outer ends of a plurality of cell assemblies SA that are arranged with the first spacers 41 and the second spacers 42 being overlapped on each other. Also, together with the plurality of cell assemblies SA, the terminal plates 73 and 74 disposed at the opposite ends of the plurality of cell assemblies SA are sandwiched between the pair of pressing members 71 and 72. In this case, the pressing force resulting from the pair of pressing members 71 and 72 causes the first extension portion 61b that is disposed on the first spacer 41 at one end of a plurality of cells 11 to make firm contact with one of the terminal plates, the terminal plate 73. Likewise, the second extension portion 62b that is disposed on the second spacer 42 at the opposite end of the plurality of cells 11 is caused to make firm contact with the other one of the terminal plates, the terminal plate 74. This provides sufficient electrical conduction between the first extension portion 61b and the terminal plate 73 and between the second extension portion 62b and the terminal plate 74. Moreover, a desired restraining pressure acts on each of the cells 11 via the first spacer 41 and the second spacer 42. In this embodiment, the terminal plates 73 and 74 are provided with output terminals 73a and 74a, respectively, for outputting the electric power of the battery pack 10. Because the terminal plates 73 and 74 are disposed at the outer ends of the plurality of cell assemblies SA arranged so that the first spacers 41 and the second spacers 42 are overlapped on each other, it is easy to allow the battery pack 10 to output the electric power to outside.

From the viewpoints of providing reliable electrical conduction and also reducing electrical resistance therein, it is desirable that the area in which the first extension portion 61b of one cell assembly SA(i) and the second extension portion 62b of the other cell assembly SA(j) are in contact with each other should be wider.

Figure 6:
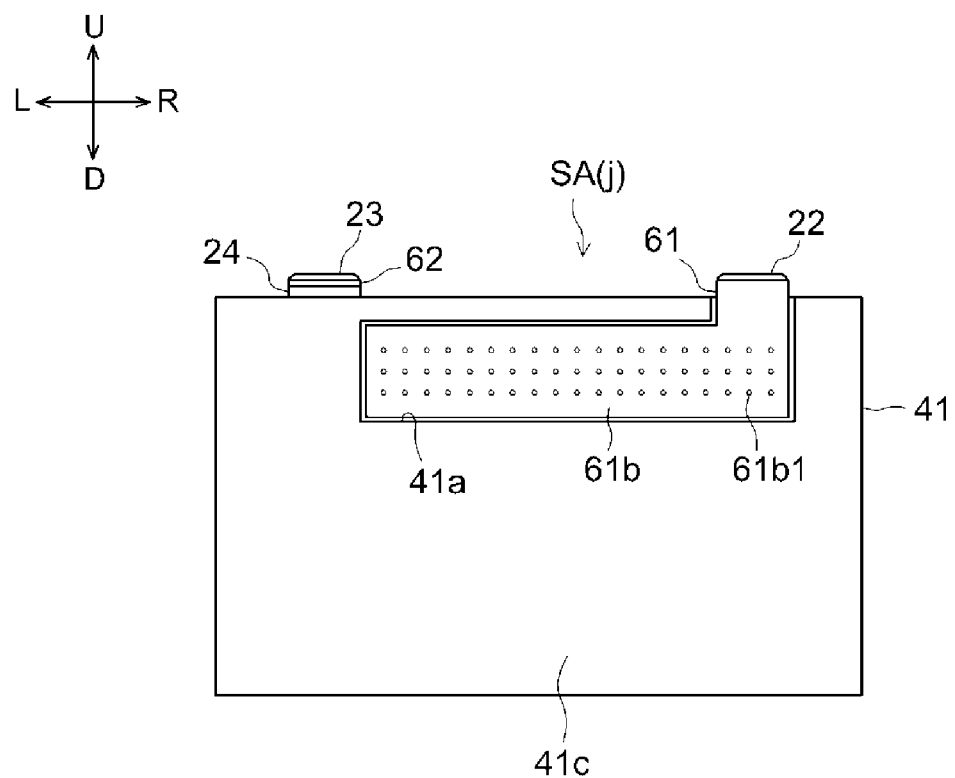
FIG. 6 is a side view illustrating a cell assembly SA(j) according to another embodiment of the disclosure.

FIG. 6 is a side view illustrating a cell assembly SA(j) according to another embodiment of the disclosure. In the embodiment shown in FIG. 6, the first extension portion 61b extends to a laterally middle portion of the first spacer 41. Although not shown in the drawing, the second extension portion 62b (see FIG. 3), which is opposite the first extension portion 61b, also preferably extends to a laterally middle portion of the second spacer 42. In this case, the first extension portion 61b and the second extension portion 62b can be in contact with each other also at the laterally middle portion between the first spacer 41 and the second spacer 42. This enables the first extension portion 61b and the second extension portion 62b to be in contact with each other in a wider area between the first spacer 41 and the second spacer 42.

It is also possible that the first extension portion 61b and the second extension portion 62b may be in contact with each other in a wider area between the first spacer 41 and the second spacer 42. For example, the area in which the first extension portion 61b of one cell assembly SA(i) of adjacent cell assemblies SA(i) and SA(j) and the second extension portion 62b of the other cell assembly SA(j) are in contact with each other should preferably be 20% or greater of the area in which the first spacer 41 and the second spacer 42 are overlapped on each other. The area in which the first extension portion 61b of one cell assembly SA(i) of adjacent cell assemblies SA(i) and SA(j) and the second extension portion 62b of the other cell assembly SA(j) are in contact with each other should be more preferably 25% or greater, still more preferably 50% or greater, and even more preferably 75% or greater, of the area in which the first spacer 41 and the second spacer 42 are overlapped on each other.

It is also possible that either one of the first extension portion 61b or the second extension portion 62b may be provided with protuberances in the surface in which the first extension portion 61b and the second extension portion 62b are in contact with each other. For example, as illustrated in FIG. 6, the first extension portion 61b may be provided with protuberances 61b1. In this case, when the first extension portion 61b and the second extension portion 62b are pressed against each other, the protuberances 61b1 bite into the first extension portion 61b and the second extension portion 62b. This may serve to increase the contact area between the first extension portion 61b and the second extension portion 62b (see FIG. 3).

Herein, an embodiment in which the cell assemblies SA of the battery pack 10 are connected in series is illustrated as an example. However, the battery pack 10 proposed herein is not limited to the embodiment in which the cell assemblies SA of the battery pack 10 are connected in series.

Figure 7:
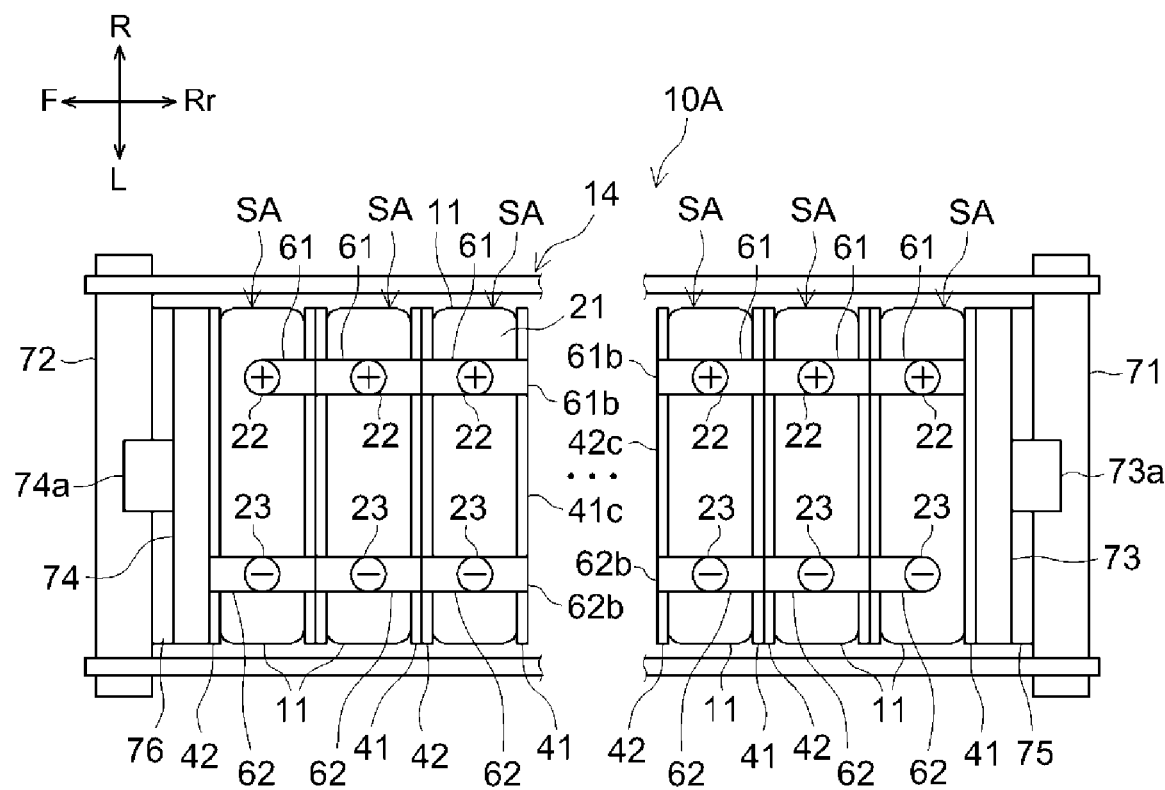
FIG. 7 is a plan view illustrating a battery pack 10A according to another embodiment of the disclosure.
Figure 8:
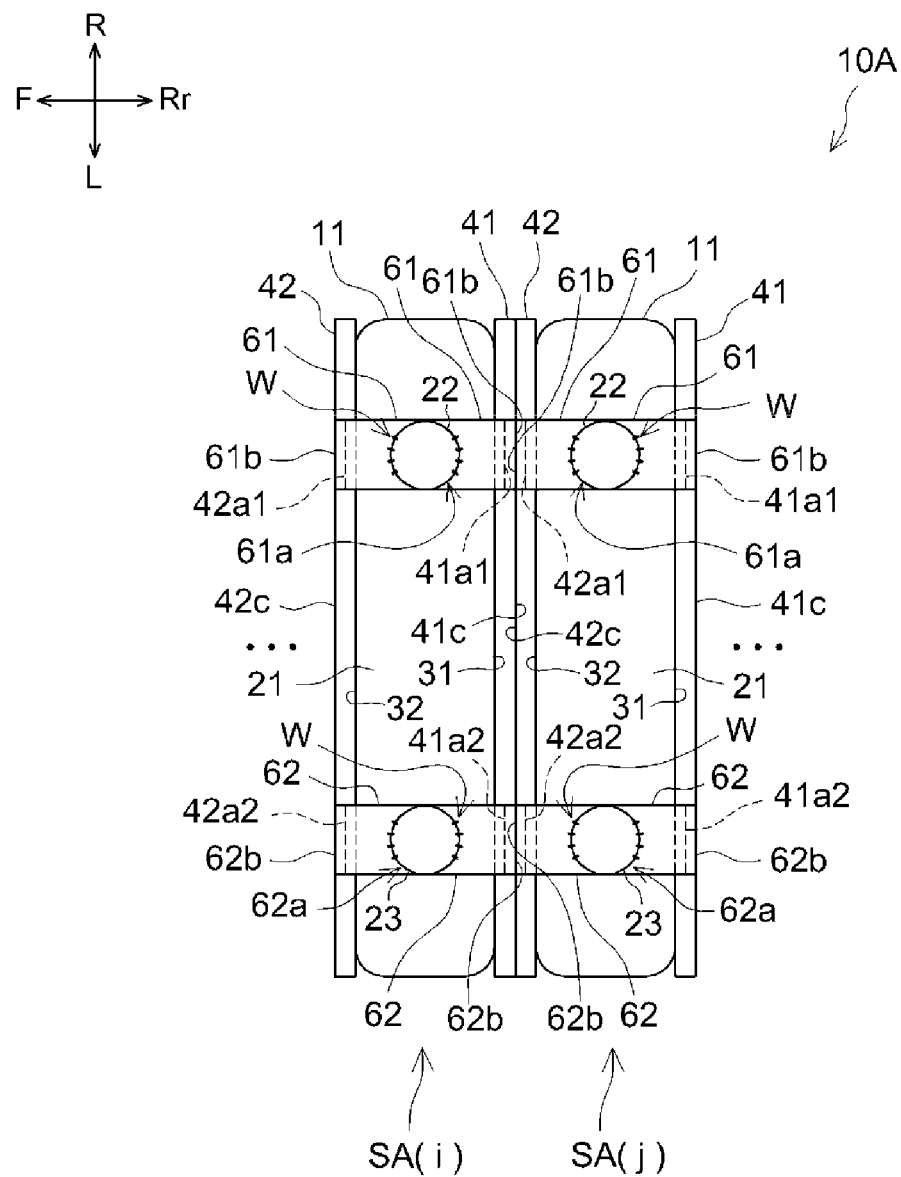
FIG. 8 is a plan view illustrating cell assemblies SA(i) and SA(j) that are adjacent to each other in the battery module 10A.

FIG. 7 is a plan view illustrating a battery pack 10A according to another embodiment of the disclosure. FIG. 8 is a plan view illustrating adjacent cell assemblies SA(i) and SA(j) of the battery pack 10A. In FIGS. 7 and 8, a plurality of cell assemblies SA are electrically connected in parallel. In the battery pack 10A, as illustrated in FIG. 7, the first extension portions 61*b* of the cell assemblies SA extend respectively along the outer side surface 41*c* of the first spacer 41 and the outer side surface 42*c* of the second spacer 42. The second extension portions 62*b* of the cell assemblies SA extend respectively along the outer side surface 41*c* of the first spacer 41 and the outer side surface 42*c* of the second spacer 42. The positive electrode-side first extension portions 61*b* of the adjacent cell assemblies SA are overlapped on each other between the first spacer 41 and the second spacer 42 that are overlapped on each other. Also, the negative electrode-side second extension portions 62*b* of the adjacent cell assemblies SA are overlapped on each other between the first spacer 41 and the second spacer 42 that are overlapped on each other. The adjacent cell assemblies SA may be connected in parallel in this way.

As illustrated in FIG. 8, when the adjacent cell assemblies SA are connected in parallel, it is preferable that the first spacer 41 and the second spacer 42 of the adjacent cell assemblies SA should include respective first recesses 41*a*1, 42*a*1 into which the first extension portion 61*b* is fitted, and respective second recesses 41*a*2, 42*a*2 into which the second extension portion 62*b* is fitted.

It is desirable that the first extension portions 61*b* extend to a laterally middle portion of each of the first spacer 41 and the second spacer 42, and the second extension portions 62*b* extend to a laterally middle portion of each of the first spacer 41 and the second spacer 42, with the second extension portions 62*b* being electrically insulated from the first extension portions 61*b*.

Figure 9:
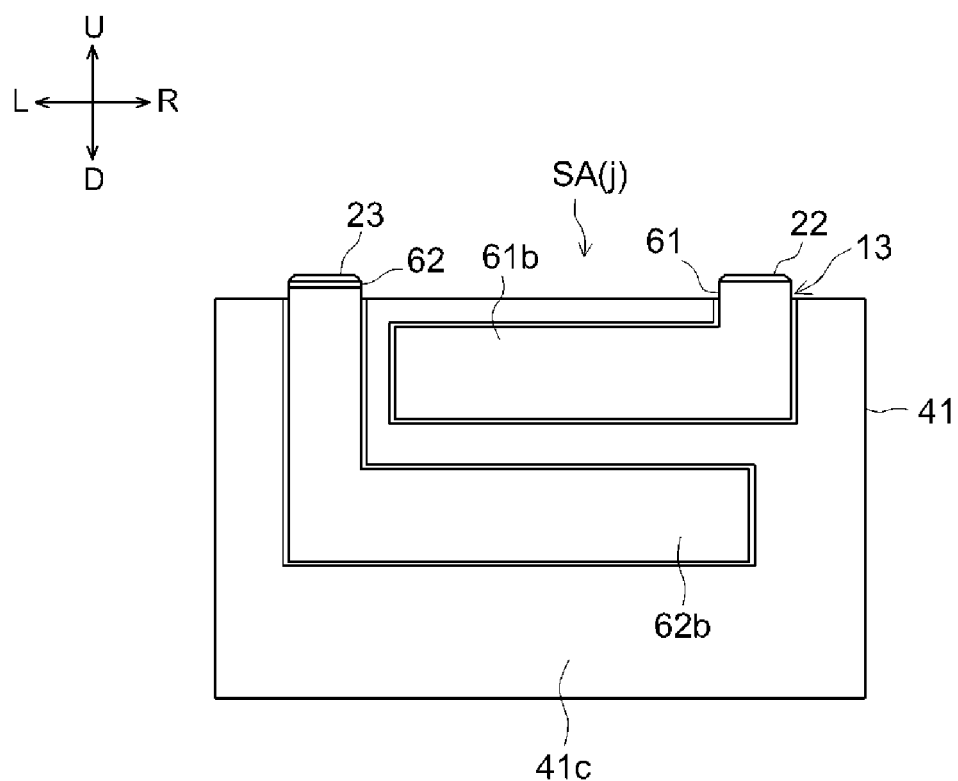
FIG. 9 is a side view illustrating a cell assembly SA(j) according to yet another embodiment of the disclosure.

Here, FIG. 9 is a side view illustrating a cell assembly SA(j) according to another embodiment of the disclosure.

FIG. 9 shows an embodiment in which the first extension portion 61*b* and the second extension portion 62*b* extend to a laterally middle portion of the spacer.

As illustrated in FIG. 9, it is desirable that the first extension portion 61*b* and the second extension portion 62*b* are staggered in the laterally middle portion of the spacer.

Figure 10:
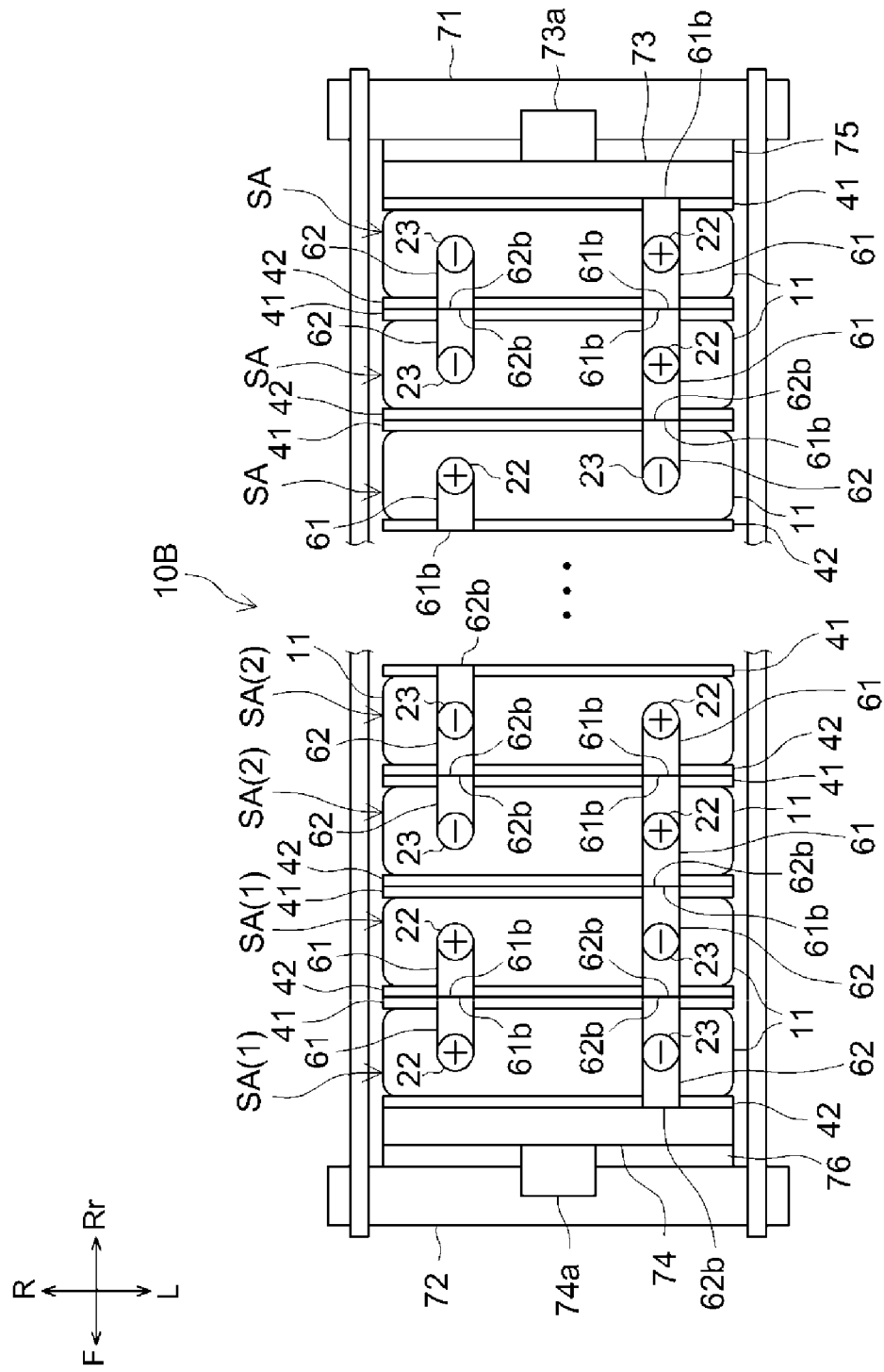
FIG. 10 is a plan view illustrating a battery pack 10B according to still another embodiment of the disclosure.

FIG. 10 is a plan view illustrating a battery pack 10B according to still another embodiment of the disclosure. In the battery pack 10B shown in FIG. 10, groups of a plurality (e.g., two in the example shown in FIG. 10) of cell assemblies SA are connected in parallel. Then, the parallel-connected plurality of cell assemblies SA are connected in series. Cell assemblies SA(1), SA(1) are connected in parallel, and cell assemblies SA(2), SA(2) are also connected in parallel. Then, the parallel-connected cell assemblies SA(1), SA(1) are connected in series to the parallel-connected cell assemblies SA(2), SA(2).

In FIG. 10, groups of two cell assemblies SA are connected in parallel. Further, the groups of the two cell assemblies SA that are connected in parallel are connected in series. It is also possible that groups of three cell assemblies SA may be connected in parallel, and it is also possible that groups of four cell assemblies SA may be connected in parallel. Thus, the number of the cell assemblies SA that are connected in parallel is not limited to a particular number. It is preferable that sets of a predetermined number of the cell assemblies SA be connected in parallel. Then, the sets of a predetermined number of the cell assemblies SA that are connected in parallel should further be connected in series.

As described above, in the battery pack 10 proposed herein, adjacent cell assemblies SA may be electrically connected in series or in parallel. In the battery pack proposed herein, the first spacer 41 of one of adjacent cell assemblies SA and the second spacer 42 of another one of the adjacent cell assemblies SA are overlapped on each other, as illustrated in FIGS. 1, 7, and 10. It is preferable that either one of the first and second extension portions 61*b* and 62*b* of the one of the adjacent cell assemblies SA and either one of the first and second extension portions 61*b* and 62*b* of the other one of the adjacent cell assemblies SA be overlapped on each other between the first spacer 41 and the second spacer 42 that are overlapped on each other.

In the battery pack proposed herein, a plurality of cell assemblies SA are restrained by the restraining member 14 along the direction in which the cell assemblies SA are arranged, as illustrated in FIGS. 1, 7, and 10. Because the cell assemblies SA are restrained by the restraining member 14, the first connecting member 61 of one cell assembly SA(i) of the adjacent cell assemblies SA(i) and SA(j) makes contact with the second extension portion 62*b* of the other cell assembly SA(j), providing reliable electrical conduction (see FIGS. 2, and 8). In addition, when the restraining member 14 is removed, the plurality of cell assemblies SA that are arranged can be easily detached from each other. Thus, this battery pack facilitates assembling of a battery pack and disassembling of the battery pack into cell assemblies SA. Also, it is easy to replace each of the cell assemblies with another one. Thus, it is easy to reuse the battery pack 10, and it is also easy to replace a deteriorated cell assembly SA.

A method of manufacturing a battery pack 10 proposed herein may include the steps of: preparing cells 11, preparing cell assemblies SA, and restraining the cell assemblies SA.

In the step of preparing cells 11, the cells 11 are prepared. As illustrated in FIGS. 3 and 4, for example, each of the cells 11 preferably includes a positive electrode terminal 22 attached to the outer casing 21, a negative electrode terminal 23 attached to the outer casing 21, and an outer casing 21 including at least a pair of opposite surfaces, the first surface 31 and the second surface 32. The details of the cell 11 have already been described hereinabove, and therefore will not be further described herein.

In the step of preparing cell assemblies SA, the cell assemblies SA are prepared. As illustrated in FIG. 3, for example, each of the cell assemblies SA includes a first spacer 41, a second spacer 42, a first connecting member 61, and a second connecting member 62, all of which are assembled onto a cell 11. The details of the first spacer 41, the second spacer 42, the first connecting member 61, and the second spacer 42 have already been described hereinabove, and therefore will not be further described herein.

In the step of restraining cell assemblies SA, a plurality of cell assemblies SA are arranged side by side, for example, as illustrated in FIG. 1. Terminal plates 73 and 74 are disposed at opposite ends of the arranged plurality of cell assemblies SA. The plurality of cell assemblies SA and the terminal plates 73 and 74, which are disposed at the opposite ends of the plurality of cell assemblies SA, are restrained by the restraining member 14. The details of the restraining member 14 have already been described hereinabove, and therefore will not be further described herein.

Here, as illustrated in FIGS. 2 and 8, the first spacer 41 of one cell assembly SA(i) of adjacent cell assemblies SA(i) and SA(j) and the second spacer 42 of another cell assemblies SA (j) are overlapped on each other. Then, either one of the first and second extension portions 61*b* and 62*b* of the one of the adjacent cell assemblies and either one of the first and second extension portions 61*b* and 62*b* of the other one of the adjacent cell assemblies be overlapped on each other between the first spacer 41 and the second spacer 42 that are overlapped on each other.

The cell assemblies SA of the battery pack 10 may be connected in series, for example, as illustrated in FIG. 1.

In this case, the step of preparing cell assemblies involves preparing a cell assembly SA wherein the first extension portion 61b extends along the outer side surface 41c of the first spacer 41 and the second extension portion 62b extends along the outer side surface 42c of the second spacer 41.

In the step of restraining the cell assemblies, it is preferable that the first extension portion 61b of the one of the adjacent cell assemblies SA and the second extension portion 62b of the other one of the adjacent cell assemblies be overlapped on each other.

It is also possible that the cell assemblies SA of the battery pack 10 may be connected in parallel, as illustrated in FIG. 7.

In this case, the step of preparing cell assemblies involves preparing a cell assembly in which the first extension portion 61b extends along both the outer side surface 41c of the first spacer 41 and the outer side surface 42c of the second spacer 42, and the second extension portion 62b extends along both the outer side surface 41c of the first spacer 41 and the outer side surface 42c of the second spacer 42.

The step of restraining the cell assemblies includes overlapping the first extension portions 61b of the adjacent cell assemblies SA on each other, and overlapping the second extension portions 62b of the adjacent cell assemblies SA on each other.

In the method of manufacturing a battery pack proposed herein, the step of preparing cell assemblies and the step of restraining the cell assemblies may be configured so that groups of a predetermined number of cell assemblies SA are connected in parallel, and the groups of a predetermined number of cell assemblies SA that are connected in parallel are further connected in series, as illustrated in FIG. 10.

Various embodiments of the battery module and the method of manufacturing the battery module have been described hereinabove according to the present disclosure. Unless specifically stated otherwise, the embodiments of the battery and the method of manufacturing the battery described herein do not limit the scope of the present invention.

For example, unless otherwise stated, the structure of the battery case and that of the electrode assembly are not limited to those described in the foregoing embodiments.

For example, in the foregoing embodiments, the positive electrode terminal 22 and the negative electrode terminal 23 are attached to the lid 21b, which is a part of the outer casing 21, However, depending on the structure of the outer casing 21, this is not necessarily the case. More specifically, the portion of the outer casing 21 to which the positive electrode terminal and the negative electrode terminal are attached is not limited to the lid. For example, it is also possible that the positive electrode terminal and the negative electrode terminal may be attached to the case main body in which the electrode assembly is enclosed.

What is claimed is:

1. A battery pack comprising:
a plurality of cell assemblies arranged side by side; and
a restraining member restraining the plurality of cell assemblies along a direction in which the cell assemblies are arranged,
each of the plurality of cell assemblies comprising:
a cell;
a first spacer;
a second spacer;
a first connecting member; and
a second connecting member,
the cell comprising:
an outer casing;
a positive electrode terminal attached to the outer casing; and
a negative electrode terminal attached to the outer casing,
the outer casing comprising:
a first surface facing an adjacent one of the cell assemblies; and
a second surface facing opposite the first surface with respect to the direction in which the cell assemblies are arranged, wherein:
the first spacer is overlapped on the first surface, and the first spacer includes a first-spacer inner side surface overlapped on the first surface and an outer side surface opposite the first-spacer inner side surface;
the second spacer is overlapped on the second surface, and the second spacer includes a second-spacer inner side surface overlapped on the second surface and an outer side surface opposite the second-spacer inner side surface;
the first connecting member is attached to the positive electrode terminal, and the first connecting member includes a first extension portion being insulated from the outer casing and extending along at least one of the outer side surface of the first spacer and the outer side surface of the second spacer;
the second connecting member is attached to the negative electrode terminal, and the second connecting member includes a second extension portion being insulated from the outer casing and extending along at least one of the outer side surface of the first spacer and the outer side surface of the second spacer; and
the first spacer of one of adjacent cell assemblies and the second spacer of another one of the adjacent cell assemblies are overlapped on each other; and either one of the first and second extension portions of the one of the adjacent cell assemblies and either one of the first and second extension portions of the other one of the adjacent cell assemblies are overlapped on each other between the first spacer and the second spacer that are overlapped on each other.

2. The battery pack according to claim 1, wherein the first connecting member and the second connecting member are respectively welded at least in part to the positive electrode terminal and the negative electrode terminal.

3. The battery pack according to claim 1, wherein:
the first extension portion of each of the plurality of cell assemblies extends along the outer side surface of the first spacer;
the second extension portion of each of the plurality of cell assemblies extends along the outer side surface of the second spacer; and
the first extension portion of the one of the adjacent cell assemblies and the second extension portion of the other one of the adjacent cell assemblies are overlapped on each other.

4. The battery pack according to claim 3, wherein the outer side surface of the first spacer includes a recess into which the first extension portion is fitted.

5. The battery pack according to claim 3, wherein the outer side surface of the second spacer includes a recess into which the second extension portion is fitted.

6. The battery pack according to claim 3, wherein:
the first extension portion extends to a laterally middle portion of the first spacer; and
the second extension portion extends to a laterally middle portion of the second spacer.

7. The battery pack according to claim 1, wherein:
the first extension portions of the plurality of cell assemblies extend respectively along the outer side surface of the first spacer and the outer side surface of the second spacer;
the second extension portions of the plurality of cell assemblies extend respectively along the outer side surface of the first spacer and the outer side surface of the second spacer; and
the first extension portions of the adjacent cell assemblies are overlapped on each other, and the second extension portions of the adjacent cell assemblies are overlapped on each other.

8. The battery pack according to claim 7, wherein:
the outer side surface of the first spacer includes:
a first recess into which the first extension portion is fitted; and
a second recess into which the second extension portion is fitted; and
the outer side surface of the second spacer includes:
a first recess into which the first extension portion is fitted; and
a second recess into which the second extension portion is fitted.

9. The battery pack according to claim 7, wherein:
the first extension portion extends to a laterally middle portion of each of the first spacer and the second spacer; and
the second extension portion extends to a laterally middle portion of each of the first spacer and the second spacer, with the second extension portion electrically insulated from the first extension portion.

10. The battery pack according to claim 1, further comprising:
terminal plates disposed respectively at opposite ends of the arranged plurality of cell assemblies, and wherein
the restraining member includes a pair of pressing members clamping the terminal plates together with the plurality of cell assemblies.

11. A method of manufacturing a battery pack, comprising the steps of:
preparing cells;
preparing cell assemblies; and
restraining the cell assemblies, wherein:
each of the cells prepared in the step of preparing cells comprises:
an outer casing including at least a pair of opposite first and second surfaces;
a positive electrode terminal attached to the outer casing; and
a negative electrode terminal attached to the outer casing; and
each of the cell assemblies prepared in the step of preparing cell assemblies comprises:
a first spacer overlapped on the first surface of the outer casing;
a second spacer overlapped on the second surface of the outer casing;
a first connecting member attached to the positive electrode terminal, the first connecting member including a first extension portion being insulated from the outer casing and extending along at least one of the outer side surface of the first spacer and the outer side surface of the second spacer; and
a second connecting member attached to the negative electrode terminal, the second connecting member including a second extension portion being insulated from the outer casing and extending along at least one of the outer side surface of the first spacer and the outer side surface of the second spacer that are overlapped on the outer casing, wherein:
the step of restraining cell assemblies comprises:
arranging a plurality of cell assemblies side by side;
disposing terminal plates at opposite ends of the arranged plurality of cell assemblies;
restraining the plurality of cell assemblies and the terminal plates disposed at the opposite ends of the plurality of cell assemblies by a restraining member;
overlapping the first spacer of one of adjacent cell assemblies and the second spacer of another one of the adjacent cell assemblies; and
overlapping either one of the first and second extension portions of the one of the adjacent cell assemblies and either one of the first and second extension portions of the other one of the adjacent cell assemblies on each other between the first spacer and the second spacer that are overlapped on each other.

12. The method according to claim 11, wherein:
in each of the cell assemblies prepared in the step of preparing cell assemblies, the first extension portion extends along the outer side surface of the first spacer, and the second extension portion extends along the outer side surface of the second spacer; and
the step of restraining the cell assemblies further comprises overlapping the first extension portion of the one of the adjacent cell assemblies and the second extension portion of the other one of the adjacent cell assemblies.

13. The method according to claim 11, wherein:
in each of the cell assemblies prepared in the step of preparing cell assemblies, the first extension portion extends along both the outer side surface of the first spacer and the outer side surface of the second spacer, and the second extension portion extends along both the outer side surface of the first spacer and the outer side surface of the second spacer; and
the step of restraining the cell assemblies further comprises overlapping the first extension portions of the adjacent cell assemblies on each other, and overlapping the second extension portions of the adjacent cell assemblies on each other.

* * * * *